(12) United States Patent
Fellhauer et al.

(10) Patent No.: US 11,467,248 B2
(45) Date of Patent: Oct. 11, 2022

(54) POSITION ESTIMATION DEVICE AND COMMUNICATION DEVICE

(71) Applicant: Sony Corporation, Tokyo (JP)

(72) Inventors: Felix Fellhauer, Stuttgart (DE); Jonas Lassen, Stuttgart (DE); Thomas Handte, Stuttgart (DE); Dana Ciochina, Stuttgart (DE); Nabil Sven Loghin, Stuttgart (DE)

(73) Assignee: SONY CORPORATION, Tokyo (JP)

( * ) Notice: Subject to any disclaimer, the term of this patent is extended or adjusted under 35 U.S.C. 154(b) by 116 days.

(21) Appl. No.: 16/967,740

(22) PCT Filed: Feb. 8, 2019

(86) PCT No.: PCT/EP2019/053146
§ 371 (c)(1),
(2) Date: Aug. 6, 2020

(87) PCT Pub. No.: WO2019/154992
PCT Pub. Date: Aug. 15, 2019

(65) Prior Publication Data
US 2021/0364593 A1 Nov. 25, 2021

(30) Foreign Application Priority Data
Feb. 8, 2018 (EP) ..................................... 18155811

(51) Int. Cl.
*G01S 5/02* (2010.01)
*H04B 17/309* (2015.01)
(Continued)

(52) U.S. Cl.
CPC .............. *G01S 5/0273* (2013.01); *G01S 5/08* (2013.01); *G01S 5/10* (2013.01); *H04B 17/309* (2015.01); *H04B 7/0456* (2013.01)

(58) Field of Classification Search
CPC ... G01S 5/273; G01S 5/08; G01S 5/10; H04B 17/309; H04B 17/0456
(Continued)

(56) References Cited

U.S. PATENT DOCUMENTS

2015/0124738 A1* 5/2015 Ramakrishna ...... H04L 25/0204
370/329
2016/0202344 A1 7/2016 Sanderovich et al.

OTHER PUBLICATIONS

Allan Zhu, et al., IEEE P802.11, Wireless LANs, Proposed 802.11az Functional Requirements, doc.: IEEE 802.11-16/0424r6, May 11, 2017, 6 pages.

(Continued)

*Primary Examiner* — Bo Fan
(74) *Attorney, Agent, or Firm* — Xsensus LLP

(57) ABSTRACT

A position estimation device for estimating the position of an initiator communication device comprises data obtaining circuitry configured to obtain path data of two or more paths of RF signals transmitted by a responder communication device, wherein RF signals of at least one path are reflected at a scatterer, said path data comprising, per path of an RF signal: path length information indicating the length of the propagation path of an RF signal from the responder communication device via a scatterer to the initiator communication device, angle of departure information indicating the angle of departure of an RF signal from the responder communication device, and angle of arrival information indicating the angle of arrival of an RF signal at the initiator communication device. The device further comprises processing circuitry configured to determine the position of the initiator communication device on the basis of the obtained path data.

19 Claims, 9 Drawing Sheets

(51) Int. Cl.
*G01S 5/08* (2006.01)
*G01S 5/10* (2006.01)
*H04B 7/0456* (2017.01)

(58) Field of Classification Search
USPC ................................ 342/451, 368, 359, 371
See application file for complete search history.

(56) References Cited

OTHER PUBLICATIONS

IEEE P802.11az/D0.5, Draft Standard for Information technology—Telecommunications and information exchange between systems Local and metropolitan area networks—Specific requirements, Nov. 2018, 127 pages.

Joe Chen, et al., "Pseudo Lateration: Millimeter-Wave Localization Using a Single RF Chain," in 2017 IEEE Wireless Communications and Networking Conference, Mar. 2017, 6 pages.

Ji Li, et al., "Mobile Terminal Location for MIMO Communication Systems," IEEE Transactions on Antennas and Propagation, vol. 55, No. 8, Aug. 2007, pp. 2417-2420.

Felix Fellhauer, et al., "Non-line-of-sight Positioning for mmWave Communications", Poster, Jun. 28, 2020, 5 pages.

IEEE P802.11ay/D0.35, Draft Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications, , May 2017, 256 pages.

Chao-Chun Wang, IEEE P802.11, Wireless LANs, Specification Framework forTGaz, doc.: IEEE 802.11-15/0132r15, May 2017, 14 pages.

Xinning Wei et al., "AOD/AOA/TOA-based 3D Positioning in NLOS Multipath Environments", IEEE 22nd International Symposium on Personal, Indoor and Mobile Radio Communications, Sep. 11, 2011, XP032102109, 5 pages.

Yaqin Xie, et al., "Closed-form Location Estimator from TOA/AOA/AOD Measurements in MIMO Communication Systems", Sarnoff Symposium, Mar. 30, 2009, XP031450878, 6 pages.

* cited by examiner

POSITION ESTIMATION DEVICE AND COMMUNICATION DEVICE

CROSS-REFERENCE TO RELATED APPLICATIONS

The present application is based on PCT filing PCT/EP2019/053146, filed Feb. 8, 2019, and claims priority to EP 18155811.5, filed Feb. 8, 2018, the entire contents of each are incorporated herein by reference.

BACKGROUND

Field of the Disclosure

The present disclosure relates to a position estimation device for estimating the position of an initiator communication device. The present disclosure relates further to a corresponding method and a communication device.

Description of Related Art

Positioning and localization in indoor scenarios is still a challenge as satellite based systems like GLONASS or Global Positioning System (GPS) cannot penetrate concrete walls of typical buildings. To overcome this restriction, various approaches have been evaluated. Besides the concept of using dedicated infrastructure like anchors or beacons that transmit acoustic, optical or electromagnetic signals, it has been considered to exploit systems that have not been built for the purpose of indoor localization. An early candidate has been WLAN infrastructure that is deployed in many indoor scenarios anyways. Instead of using Received Signal Strength Indicator (RSSI) fingerprinting which requires a priori knowledge in terms of elaborate mapping, the principle of Fine Timing Measurement (FTM) in order to accurately measure Time of Arrival (TOA) was established for reliable positioning.

The upcoming standard for indoor localization IEEE 802.11az using WLAN infrastructure will be a first step towards interoperability of TOA based positioning approaches and widely spread availability of indoor localization. Besides this, development of communication standards is leaping towards higher data rates and will make huge bandwidths available that is mostly unused in the unlicensed mmWave spectrum. Upcoming standards like IEEE 802.11ay are targeting data rates of up to 28 Gb/s. Physical characteristics like huge path loss, blockage and spatial sparsity of these channels make it necessary to use novel approaches in order to establish reliable communications.

The "background" description provided herein is for the purpose of generally presenting the context of the disclosure. Work of the presently named inventor(s), to the extent it is described in this background section, as well as aspects of the description which may not otherwise qualify as prior art at the time of filing, are neither expressly nor impliedly admitted as prior art against the present disclosure.

SUMMARY

It is an object to provide a position estimation device for reliably estimating the position of an initiator communication device in indoor scenarios. It is a further object to provide a corresponding method and communication device as well as a corresponding computer program for implementing said method and a non-transitory computer-readable recording medium for implementing said method.

According to an aspect there is provided a position estimation device for estimating the position of an initiator communication device, said position estimation device comprising:
  data obtaining circuitry configured to obtain path data of two or more paths of RF signals transmitted by a responder communication, wherein RF signals of at least one path are reflected at a scatterer, said path data comprising, per path of an RF signal:
    path length information indicating the length of the propagation path of an RF signal from the responder communication device via a scatterer to the initiator communication device,
    angle of departure information indicating the angle of departure of an RF signal from the responder communication device, and
    angle of arrival information indicating the angle of arrival of an RF signal at the initiator communication device; and
  processing circuitry configured to determine the position of the initiator communication device on the basis of the obtained path data.

According to a further aspect there is provided a communication device for RF based communication with another communication device, said communication device comprising:
  antenna circuitry comprising one or more antenna elements for transmitting and receiving RF signals; and
  a position estimation device as disclosed herein for determining the position of the communication device or of the other communication device.

According to a further aspect a communication device for RF based communication with another communication device is presented, said communication device comprising:
  antenna circuitry comprising one or more antenna elements for transmitting and receiving RF signals; and
  signalling circuitry configured to signal spatial codebook information including, per codebook index, angular information indicating the angle of departure and/or the angle of arrival of an RF signal from the communication device.

According to still further aspects a corresponding position estimation method, a computer program comprising program means for causing a computer to carry out the steps of the method disclosed herein, when said computer program is carried out on a computer, as well as a non-transitory computer-readable recording medium that stores therein a computer program product, which, when executed by a processor, causes the method disclosed herein to be performed are provided.

Embodiments are defined in the dependent claims. It shall be understood that the disclosed communication device, the disclosed position estimation method, the disclosed computer program and the disclosed computer-readable recording medium have similar and/or identical further embodiments as the claimed position estimation device and as defined in the dependent claims and/or disclosed herein.

One of the aspects of the disclosure is to enable enhanced positioning using multiple properties of arriving/departing radio frequency (RF) signals jointly in order to derive accurate position information. The disclosed approach is well suited to communication systems that use the mmWave spectrum from 3 to 300 GHz, as respective propagation characteristics allow for accurate estimation of angle of arrival (AoA) and angle of departure (AoD) of a RF signal with respect to receiver (RX; also called responder communication device) and transmitter (TX; also called initiator communication device).

The disclosed approach can be implemented for Line-of-Sight (LOS) scenarios as well as non-LOS scenarios. In contrast to other methods the disclosed approach can even provide location information in situations where no global angular reference and no Line-of-Sight is available. Moreover, the disclosed approach can be applied for Hybrid SISO (Single Input Single Output) systems employing a single phased array antenna (PAA) per participant and further enhanced to Hybrid MIMO systems that employ multiple PAAs on both sides.

As an additional benefit, the disclosed approach allows not only to estimate the positions of TX and RX but also the position of reflections, herein referred to as scatterer positions of scatterers. This is especially beneficial as it includes information about the environment which can be exploited in diverse manner (i.e. for beamforming, floorplan reconstruction, virtual reality, etc.).

The term "scatterer" as used herein shall be understood generally, including active relays and responders as alternatives to passive reflective objects. If, e.g., the distance between an access point and a station cannot be bridged in one hop, a responder may "amplify and forward" the signal from one device to the other. A relay, in addition, may even perform "decoding and forwarding" the signal.

Similarly, the term "communication device" as used herein shall be understood generally, including devices which transmit only static beacons. An anchor point, e.g., may not transmit any information in the sense of data communication, but transmits continuously, periodically or at certain times a known preamble sequence or a beacon signal which can be used for positioning.

The signaling of angular information in the context of the present disclosure is in general independent of the direction in which the physical signal is propagating (reception or transmission), meaning direction information associated with any codebook entry describing angle of arrival and/or angle of departure.

This angular information may commonly be measured by transmitting a signal in multiple directions with a known angle of departure at a first device and measuring the received signal strength at a second device, using a non-directive antenna or antenna configuration.

As used herein, angular information at a first communication device (e.g. an initiator communication device or a station, STA) is described as angle of arrival, and angular information at a second communication device (e.g. a responder communication device or an access point, AP) as angle of departure. However, it should be noted that the terms "arrival" and "departure" do not necessarily correspond to the operation of reception/transmission, i.e. the "angle of departure information" may alternatively be understood and referred to as "first angular information" (indicating the angle at which a signal is transmitted or received) and the "angle of arrival information" may alternatively be understood and referred to as "second angular information" (indicating the angle at which a signal is transmitted or received). Commonly, the angle of departure information and the angle of arrival information may be referred to as "angular information".

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWING

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF THE EMBODIMENTS

One of the concepts of this disclosure is the usage of PAAs, which increase the antenna gain, allow dynamic adaption to the channel and therefore counteract the huge path loss and angular sparsity of mmWave channels. As a side effect, usage of PAAs allows to estimate channel properties like Direction of Arrival (DoA) and Direction of Departure (DoD) very accurately. It has been shown that these channel properties can be exploited in order to deliver positioning information in line-of-sight (LOS) situations. Further, a valid positioning might even be possible in NLOS situations for rich scattering outdoor scenarios. Investigations on positioning for mmWave channels lead to a concept that allows to estimate not only a position of a Station (STA), relative to an Access Point (AP), even without presence of a LOS path, but further allows to estimate positions of reflectors (i.e. walls or other obstacles). This additional information might be used for beamforming or Simultaneous Localization and Mapping (SLAM). In the following the general idea will be described as well as an extension that does not require presence of an angular reference.

Figure 1:
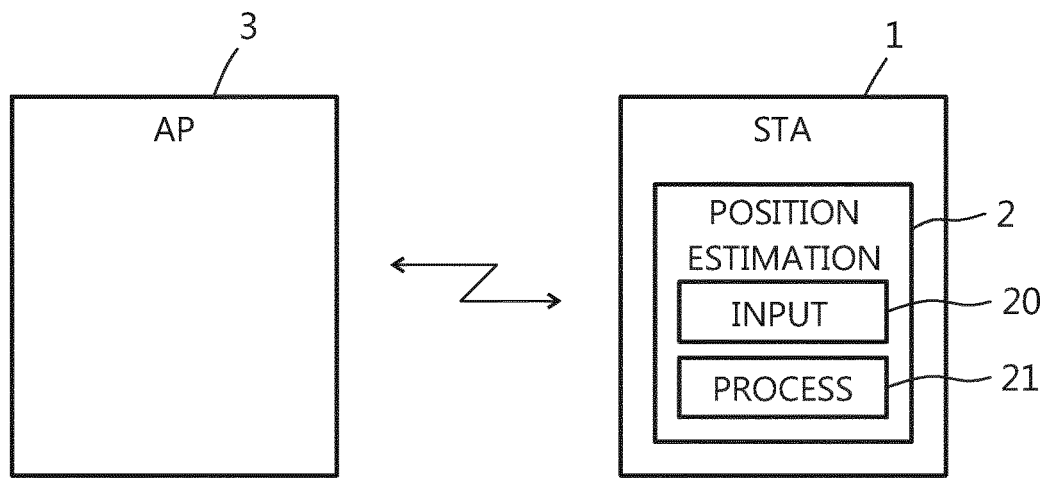
FIG. 1 shows a schematic diagram of a first embodiment of an initiator communication device including an internal position estimation device and a responder communication device according to the present disclosure.

Referring now to the drawings, wherein like reference numerals designate identical or corresponding parts throughout the several views, FIG. 1 shows a schematic diagram of a first embodiment of an initiator communication device 1 (e.g. a STA as an embodiment of a communication device) including an internal position estimation device 2 and a responder communication device 3 (e.g. an AP as an embodiment of a communication device) according to the present disclosure. In general, the position estimation device can be located in different physical places. To maintain a high level of privacy, the information required to estimate position should be available only to the station itself, which makes the configuration as shown in FIG. 1 the preferred arrangement.

The position estimation device 2 is configured to estimate the position of the initiator communication device 1. It comprises data obtaining circuitry 20, e.g. a wireless data interface, configured to obtain (i.e. retrieve or receive) path data of two or more paths of RF signals transmitted by the responder communication device 3, wherein RF signals of at least one path are reflected at a scatterer. Said path data comprise per path of an RF signal:
- path length information indicating the length of the propagation path of an RF signal from the responder communication device 3 via a scatterer to the initiator communication device 1,
- angle of departure (AoD) information (also called first angular information) indicating the angle of departure of an RF signal from the responder communication device 1, and
- angle of arrival (AoA) information information (also called second angular information) indicating the angle of arrival of an RF signal at the initiator communication device.

The position estimation device 2 further comprises processing circuitry 21 configured to determine the position of the initiator communication device 1 on the basis of the obtained path data. This will be explained in more detail below.

It shall be noted here that path data thus include reflection data, which are data of one or more reflection of RF signals at one or more scatterers, but may (in addition to at least one set of reflection data of one reflection path) also include line-of-sight data, which are data directly transmitted to the initiator communication device 1 from the responder communication device 3. Both the reflection data and the LOS data may provide path length information, AoD information and AoA information that can be used to determine the position of the initiator communication device 1.

Figure 2:
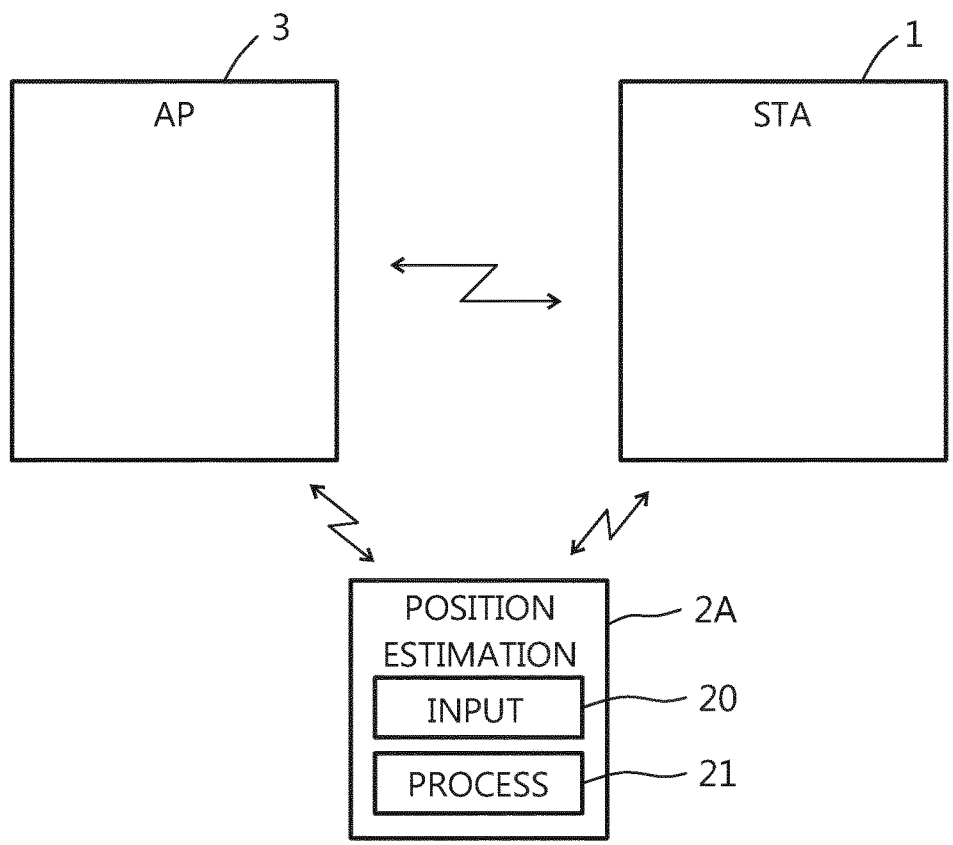
FIG. 2 shows a schematic diagram of a second embodiment of an initiator communication device, a responder communication device and an external position estimation device according to the present disclosure.

FIG. 2 shows a schematic diagram of a second embodiment of an initiator communication device 1, a responder communication device 3 and an external position estimation device 2A according to the present disclosure. The external position estimation device 2A is generally configured in the same way as the internal position estimation device 2 and comprises substantially the same data obtaining circuitry 20 and processing circuitry 21. In a third embodiment according to the present disclosure (not shown) the internal position estimation device 2 is included in the responder communication device 3, which may be useful due to the advantage that the responder communication device 3 may have a higher computational power than the initiator communication device 1.

For explaining a first embodiment of the position estimation according to the present disclosure it will be assumed that the AP (reference-) position is known and all signal names are derived from the downlink perspective. Hence, DoD always depicts angles associated with the AP and DoA depicts respective angles associated with the STA. Further, it is assumed, that the considered scenario extends in a two-dimensional space, although it can be extended to a three-dimensional scenario or reciprocal, three dimensional scenarios can be reduced in dimensionality by e.g. projection. The STA position, which is assumed to be unknown, shall be determined.

The method described in the following can provide positioning location even in NLOS-scenarios and is, with some further modifications as provided in preferred embodiments, even able to overcome the need for an angular reference. Further embodiments may be provided in order to enhance accuracy.

Figure 3:
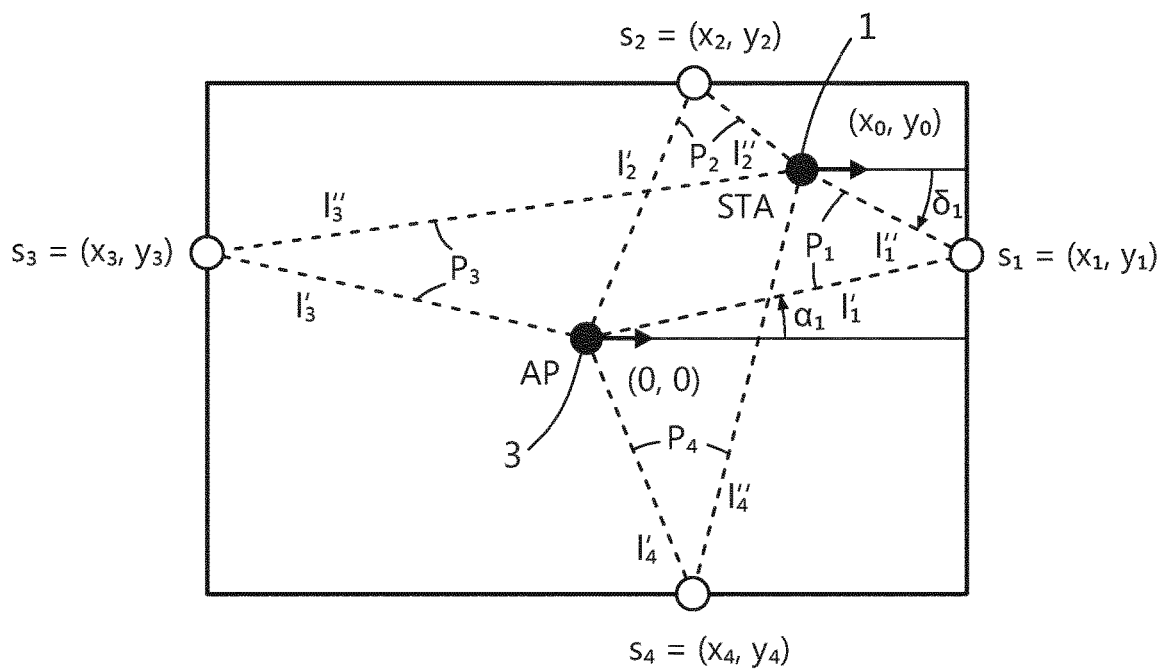
FIG. 3 shows a diagram illustrating a NLOS scenario for explaining the position estimation performed according to the present disclosure.

FIG. 3 shows a diagram illustrating a NLOS scenario for explaining the position estimation performed according to a first embodiment of the present disclosure. If a communication scenario as shown in FIG. 3 is assumed, four first-order reflections can be determined. The first-order reflections connect AP 3 and STA 1, which are caused by scatterers $s_k$ with k=1 . . . 4 and respective locations $(x_k, y_k)$ located on bounding walls of the scenario. Associated with each scatterer $s_k$ there is a propagation path $P_k$ of length $l_k$ that connects AP 3 and STA 1 via $s_k$. It can be separated into lengths $l'_k$ from AP 3 to $s_k$ and $l''_k$ from $s_k$ to STA 1. It is desired to determine the location of the STA, $(x_0, y_0)$, relative to the position of the AP, which is assumed to be a known reference (0, 0).

For the channel at either AP- or STA-side it can be observed:
- Time of Flight (TOF) of the k-th path $r_k$ which allows deriving $l_k = \tau_k \cdot c_0 = l''_k + l'_k$ by assuming $c_0$ as the signals propagation speed and
- respective AoA/AoD information $\alpha_k$ and $\delta_k$ with respect to some reference direction R, as illustrated in FIG. 4.

Figures 4A, 4B:
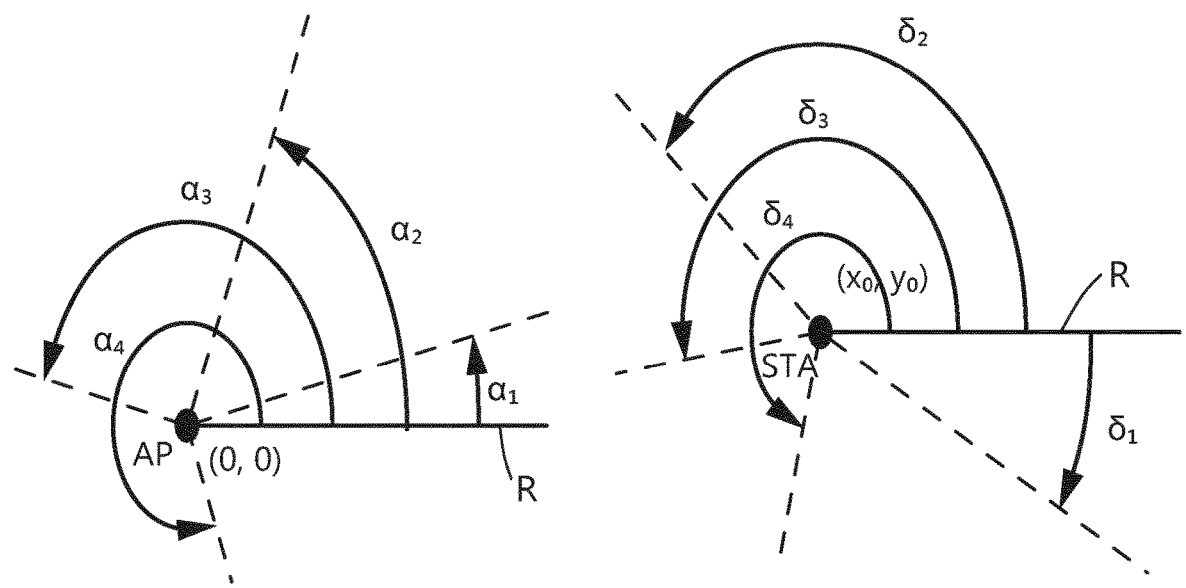
FIG. 4 shows a diagram illustrating AoD and AoA measurements with respect to an angular reference.

FIG. 4 shows a diagram illustrating AoD and AoA measurements with respect to an angular reference R (also called approach 1 herein). FIG. 4A shows AoD measurements of $\alpha_1 \ldots \alpha_4$ in presence of a shared angular reference R. FIG. 4B shows respective AoA measurements of $\delta_i \ldots \delta_4$ on STA-side.

If these parameters as stated are assumed, a system of equations can be defined to describe the relation between AP position (0, 0) which is assumed to be known, scatterer positions $s_1 \ldots s_4$, and STA position $s_0$, which are assumed to be unknown and cannot be directly measured, depending on AoD/AoA-information $\alpha_1 \ldots \alpha_4 / \delta_1 \ldots \delta_4$ and path lengths $l_1 \ldots l_4$ (derived from TOA-information $\tau_i \ldots \tau_4$) which can be observed by STA and AP.

Equation (1) states the specific path length depending on $s_0$ and $s_k$ as:

$$l_k(s_k) = \underbrace{\sqrt{x_k^2 + y_k^2}}_{l'_k} + \underbrace{\sqrt{(x_0 - x_k)^2 + (y_0 - y_k)^2}}_{l''_k} \text{ with } s_k = (x_k, y_k). \quad (1)$$

Equation (2) states the relation of angular information depending on $s_0$ and $s_k$ to be:

$$\alpha_k(s_k) = \arctan\frac{y_k}{x_k}, \quad (2)$$

$$\delta_k(s_k, s_0) = \arctan\frac{y_k - y_0}{x_k - x_0}.$$

Out of the positions vector s with equations (1) and (2) respective observed values can be derived $$F(s) = \begin{pmatrix} l_1(s_1) \\ \vdots \\ l_K(s_K) \\ \alpha_1(s_1) \\ \vdots \\ \alpha_K(s_K) \\ \delta_1(s_1, s_0) \\ \vdots \\ \delta_K(s_K, s_0) \end{pmatrix}. \quad (3)$$

Assuming the observation vector $y=(l_1, \ldots, l_K, \alpha_1, \ldots, \alpha_K, \delta_1, \ldots, \delta_K)^T$ containing perfect measurements the system of equations (SoE) can be stated to fulfil $$F(s)-y=0. \quad (4)$$

Thus, in order to find the solutions vector s which contains the desired STA location, equation (4) is solved for a given observations vector y.

This model holds for the ideal assumption where the measurements are not affected by noise. To more accurately model realistic scenarios, noisy measurements are assumed in the following. If it is assumed that the observed values for both, AoA/D- and TOA-measurements are superimposed by a Gaussian noise $n_{\measuredangle} \sim \mathcal{N}(0, \sigma_{\measuredangle})$ with variance $\sigma_{\measuredangle}$ for angular measurements and $n_t \sim \mathcal{N}(0, \sigma_t)$ for temporal measurements, their respective vector of noisy measurements can be arranged to $\tilde{y}$:

$$\tilde{l}_k = l_k + \frac{c_0 \cdot n_t}{n_l}, \quad (5)$$

$$\tilde{\alpha}_k = \alpha_k + n_{\measuredangle} \text{ and } \tilde{\delta}_k = \delta_k + n_{\measuredangle}$$

$$\tilde{y} = (\tilde{l}_1, \ldots, \tilde{l}_K, \tilde{\alpha}_1, \ldots, \tilde{\alpha}_K, \tilde{\delta}_1, \ldots, \tilde{\delta}_K)^T \quad (6)$$

As the observed variables are affected by independent noise realizations, it is no longer possible to fulfill equation (4) perfectly. Thus, vector s shall be found such that the squared error between observed values and geometrically defined results is minimized:

$$\tilde{s} = \min_s \|\tilde{y} - F(s)\|_2^2. \quad (7)$$

To find a solution that fulfills equation (7), one of the following methods might be used:

Gauss-Newton algorithm, Levenberg-Marquardt method, Deep Neural Network (DNN), Particle-Filter, Kalman Filter, or Gradient Descend.

So far a simple rectangular scenario has been assumed, which models most of indoor scenarios and provides K=4 reflections from walls for every STA location within the wall boundaries. To determine if the equation system in general is solvable for arbitrary scenarios, the number of knowns and unknowns can be observed as follows. If equation (4) is analyzed with respect to the number of unknown variables N in dependence of K, the STA coordinates ($x_0$, $y_0$) plus K coordinate pairs of scatterers can be found, which leads to N=2·(1+K). The number of known variables M is increased by 3 for every additional first-order propagation path (AoA/D- and TOA-measurements) such that M=K·3. This relation allows deriving the minimum K required to find a unique solution of (4):

$$M \geq N \rightarrow K \cdot 3 \geq 2 \cdot (1+K) \rightarrow K \geq 2 \quad (8)$$

In the scenario visualized in FIG. 3, K=4 so the condition in equation (8) is fulfilled.

Figure 5:
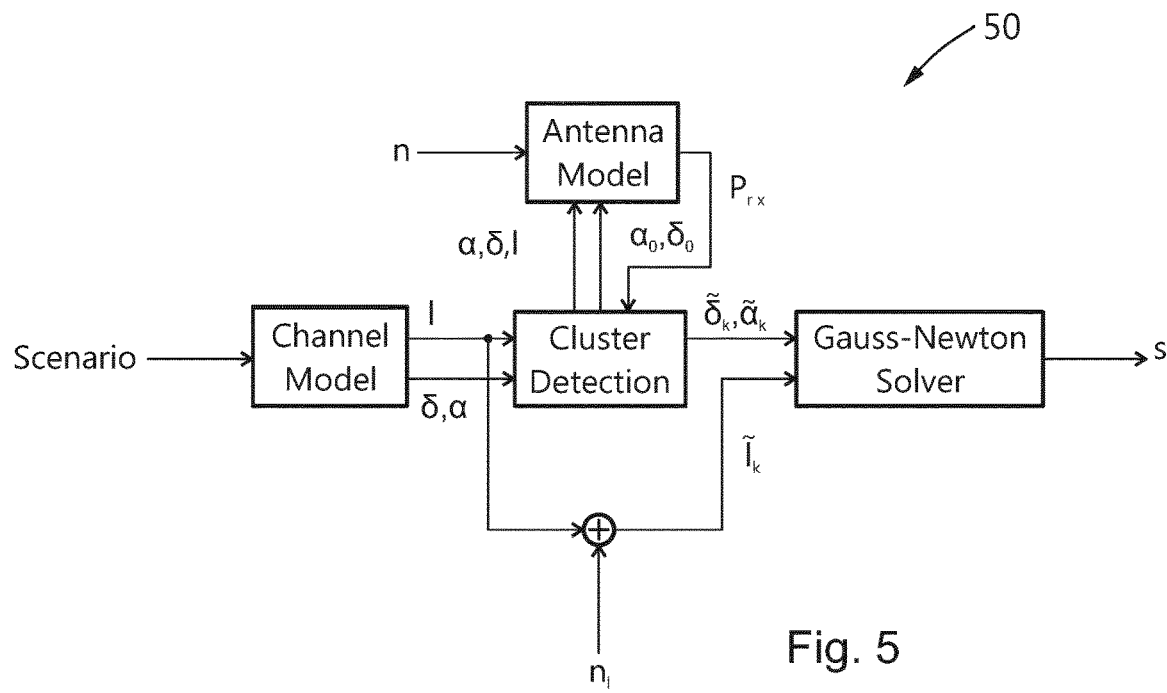
FIG. 5 shows a schematic diagram of an evaluation system.

In order to evaluate performance of the concept introduced above, a system model has been implemented. To solve the system of equations, the Gauss-Newton method is used. FIG. 5 shows the architecture of the evaluation system 50 in form of a block diagram. A geometrical scenario like introduced in FIG. 3 is modelled and the respective omnidirectional channel impulse response $h_{omni}$ is derived with geometrical properties l, δ, α.

To model the effect of noisy TOA measurements like introduced in equations (5) and (6), Gaussian noise is superimposed with variance $\sigma_t^2$ to the geometrically derived values for l. To model the AoA/D noise accurately, a cluster detection algorithm has been implemented, that systematically sweeps through transmit directions by adjusting transmit direction of a PAA model with n antenna elements and analyzing received power $P_{rx}$. The resulting noisy measurements are used to state the system of equations in equation (7).

Figure 6:
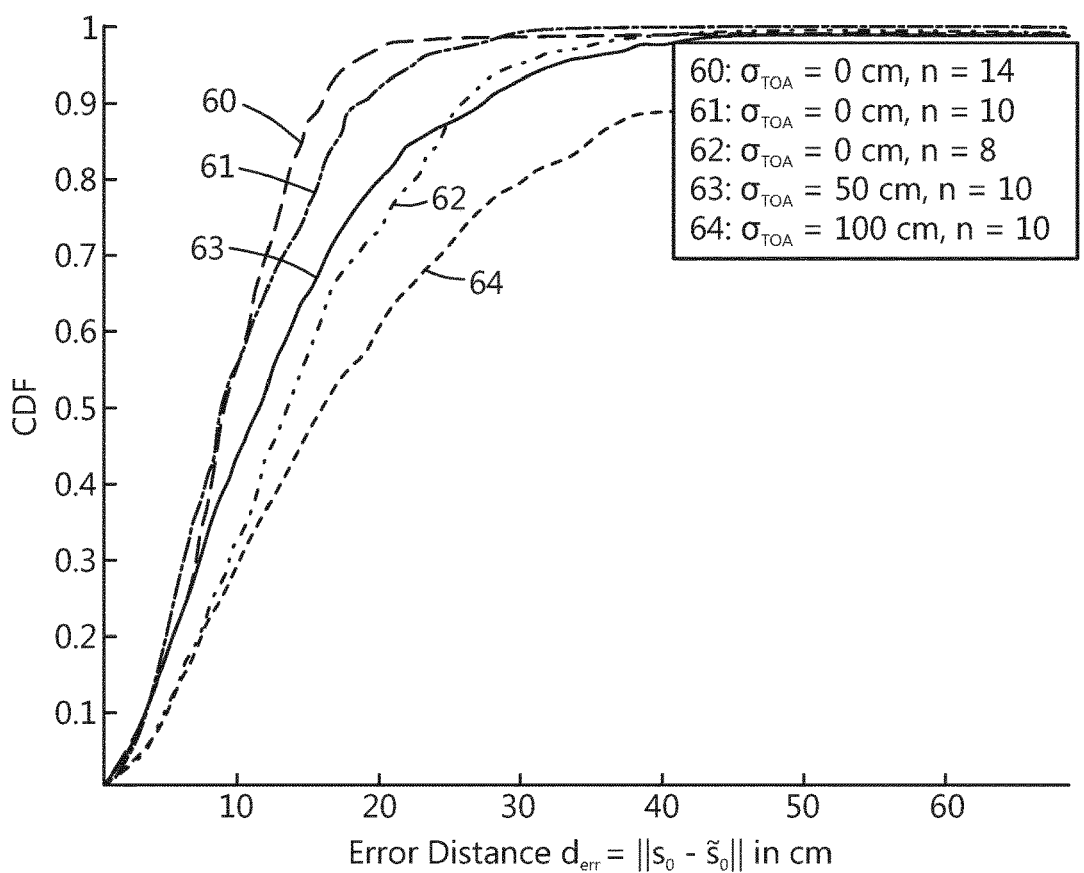
FIG. 6 shows a diagram of resulting cumulative distribution function for Euclidian distance between actual position and estimated position.

To find a solution for this system of equations, many standard methods can be employed. It can be shown that using the Gauss-Newton method can achieve good results under realistic assumptions with respective dimensions of the scenario and noise variance of measured values. FIG. 6 shows simulation results for the described method using the Gauss-Newton method. FIG. 6 particularly shows a comparison of resulting CDF (cumulative distribution function) for Euclidian distance between actual STA-position $s_0$ and estimated STA-position $\tilde{s}_0$ with absolute angle information for different sized quadratic PAAs ($n=n_x=n_y$) and different standard deviation $\sigma_{TOA}$ of TOA-measurements.

As the implemented solver method for the stated system of equations requires presence of start-values (i.e. an initial results-vector $s_{init}$) from that on the iterative process of solving is started, a heuristic method is implemented to systematically generate a set of start-vectors ("seeds"). It may be useful to test systematically through multiple seeds as some of the seeds might not converge towards the true solution but diverge.

Figure 7:
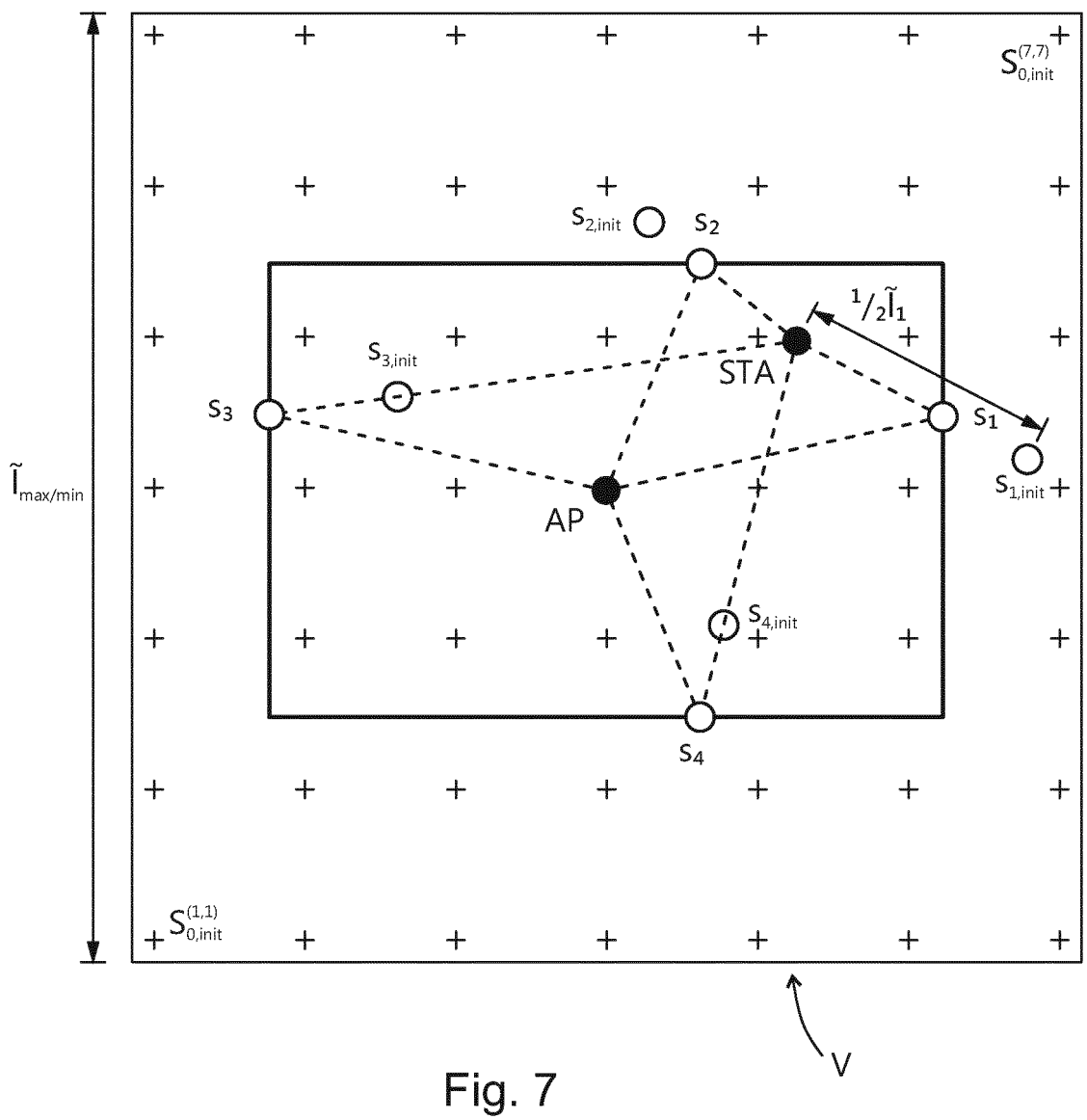
FIG. 7 shows a diagram illustrating the systematic generation of seed vectors.

The solution vector comprises two parts: i) STA position about which we assume to have no prior information and ii) scatterer positions, of which we already know an estimated direction by measured AoA and AoD values and the maximal distance from the AP given by TOA information. Using this information, a set of seeds may be constructed that have initial scatterer positions by assuming (l"=r·l and l'=(1−r)·l here with r=½):

$$s_{k,init}, y_{k,init})$$

with $x_{k,init} = \frac{1}{2} \tilde{l}_k \cdot \cos \tilde{\alpha}_k$ and $y_{k,init} = \frac{1}{2} \tilde{l}_k \cdot \sin \tilde{\alpha}_k$ when the seeds are generated from the AP perspective (using AoD), or $x_{k,init} = \frac{1}{2} \tilde{l}_k \cdot \cos \tilde{\delta}_k$ and $y_{k,init} = \frac{1}{2} \tilde{l}_k \cdot \sin \tilde{\delta}_k$ when the seeds are generated from the STA perspective (using AoA). Thus, the initial scatterer positions are placed midway on the estimated direct path between STA and AP. An example of this method is shown in FIG. 7. Here the scatterer seeds $s_{1 \ldots 4, init}$ are generated based on angular information at the STA and its respective length (shown for $s_{1,init}$ with $\frac{1}{2}\tilde{l}_1$ explicitly in FIG. 7). Alternatively to setting r to a fixed value (here: r=½), it might be derived from some random distribution or from a grid.

For the initial values of the STA positions, a grid of STA positions in a "bounding box" is assumed, within bounds determined by the maximum estimated path lengths $\tilde{l}_{max}$ (minimum might also be applicable, but more likely to produce seeds that converge to the true solution):

$$s_{0,init} = (x_{0,init}, y_{0,init}) \text{ with } x_{0,init} =$$

$$\frac{\tilde{l}_{max}}{2} \cdot \frac{1}{n_{x,max}} \cdot n_x \text{ and } y_{0,init} = \frac{\tilde{l}_{max}}{2} \cdot \frac{1}{n_{y,max}} \cdot n_y,$$

$$\{n_{x/y} \in \mathbb{Z} \mid -n_{x/y,max} \leq n_{x/y} \leq +n_{x/y,max}\}$$

and $$n_{seed} = (2n_{x,max} + 1) \cdot (2n_{y,max} + 1) \text{ with } n_{x,max},$$

$$n_{y,max} \in \mathbb{Z},$$

leaving the number of seeds to be generated $n_{seed}$ and whether to use $\tilde{l}_{min}$ or $\tilde{l}_{max}$ to determine the size of the "bounding box" as an implementation specific parameters. An example with a total number of $n_{seed}=49$ is shown in FIG. 7 indicated by crosses, marking start values for the STA position. The shaded area V indicates the "bounding box" of squared shape with dimensions of $\tilde{l}_{max} \times \tilde{l}_{max}$ or $\tilde{l}_{min} \times \tilde{l}_{min}$. The seed values for the STA position (i.e. the crosses) are derived in form of an equidistant grid from the minimum or maximum of measured path lengths. In addition, four seed values for positions of scatterers (circles) are derived using AoA measurements from the STA perspective. Both types of seed values, STA positions and scatterer positions are required to form a start vector.

In the above described embodiment positioning is performed by use of absolute angle information, as e.g. illustrated in FIG. 4 using an angular reference R. In the following another embodiment will be described, in which positioning is performed without use of absolute angle information but with differential angle information.

One of the restrictions of the above described method (approach 1) for real world applications is the requirement of an angular reference (R in FIG. 4) which needs to be known to both, STA and AP. In order to resolve this dependency, the above described embodiment has been modified as follows.

Figure 8A:
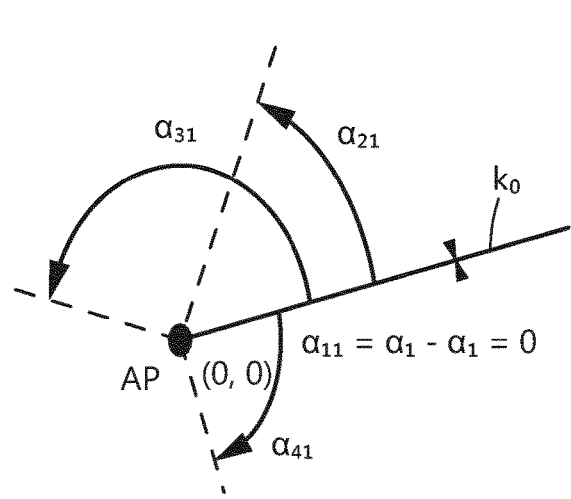
FIG. 8 shows a diagram illustrating AoD and AoA measurements with respect to a selected propagation reference.
Figure 8B:
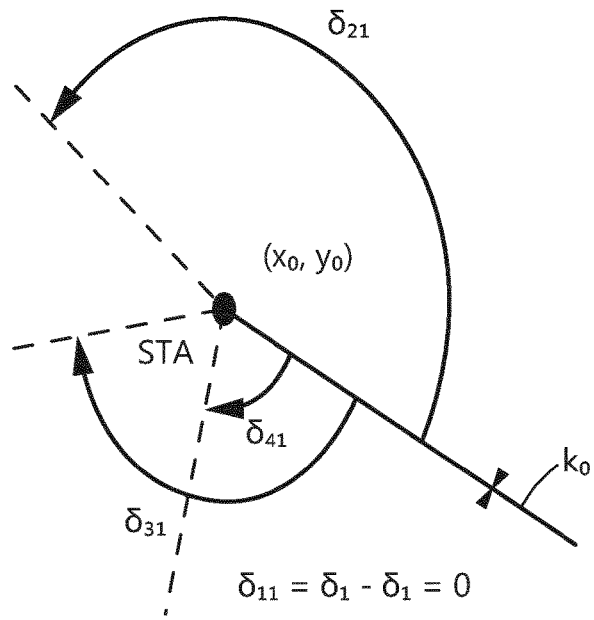

All angles $\alpha_k$ and $\delta_k$ are no longer measured relative to a global reference direction but with respect to one reference path $k_0 \in \{1, \ldots, K\}$ (or multiple reference paths). A set of relative angles $\alpha_{kk_0}$ and $\delta_{kk_0}$ can thus be defined as illustrated in FIG. 8 (also called approach 2 herein). FIG. 8A illustrates differential AoD measurement with path $k_0=1$ to $s_1$ selected as reference path. FIG. 8B illustrates respective differential AoA measurements at STA-side. AP and STA only need to agree on which path to be used as a reference. FIG. 8 shows the definition of these differential angles that can be used as input values in order to formulate a system of equations in analogy to equation (1) but replacing the terms for absolute angles by angles relative to direction of path $k_0$ leading to $$F(s, k_0) = \begin{pmatrix} l_1(s_1) \\ \vdots \\ l_K(s_K) \\ \alpha_1(s_1) - \alpha_{k_0}(s_{k_0}) \\ \vdots \\ \alpha_K(s_K) - \alpha_{k_0}(s_{k_0}) \\ \delta_1(s_1, s_0) - \delta_{k_0}(s_{k_0}) \\ \vdots \\ \delta_K(s_K, s_0) - \delta_{k_0}(s_{k_0}) \end{pmatrix}. \quad (9)$$

To find a solution for the modified problem, we use the same approach as mentioned in Approach 1. Respectively the expression in (8) changes to:

$$M \geq N \to k+2 \cdot (k-1) \geq 2 \cdot (1+k) \to k \geq 4, \quad (10)$$

which is still fulfilled in scenarios as shown e.g. in FIG. 3. The main advantage of this embodiment is the independence of the presence of an angular reference which can be a major advantage in many situations. Further, the requirement in equation (10) can be relaxed in cases where one or both sides employ multiple RF-chains (H-MIMO). Then the number of observed variables can be increased drastically by constant factor C as each of the RF-chains is located in a slightly different position and therefore allows to get as many independent measurements as possible combinations $C=N_{tx} \times N_{rx}$ of STA RF-chains $N_{rx}$ and AP RF-chains $N_{tx}$. Further assuming, that the separation of RF-chains at STA and AP is signaled and therefore known to the device performing the position estimation, instead of estimating x- and y-coordinates for each RF-chain, only a single pair of coordinates and respective device orientation $\varphi_{tx/rx}$ needs to be estimated. This changes relation (10) to $$C \cdot (K + 2K - 2) \geq 2(1 + K) + u[N_{tx}] + u[N_{rx}] \text{ with } [x] = \begin{cases} 0, & x \leq 1 \\ 1, & x > 1 \end{cases},$$

resulting in $$K \geq \frac{2(C+2)}{3C-2}$$

for a MIMO system with $N_{tx}, N_{rx} > 1$ and $$K \geq \frac{2(C+3)}{3C-2}$$

for SIMO/MISO systems.

A number of possible applications, modifications and extensions of the previously described embodiments exist which shall be described in the following.

In one embodiment, in order to find out whether a LOS or NLOS situation is observed, Line-of-Sight-paths may be added to both equation systems introduced in equations (1, 2, 3) and (9) and LOS- and N LOS-systems may be solved simultaneously. Then, in a second step, a decision can be made based on the remaining errors. If the remaining error of the LOS-System of scenario is lower, the observed situation most likely is LOS and NLOS otherwise.

As more and more methods for localization are developed, the concept of sensor fusion is drawing increasingly attention. It is well known that fusion algorithms can benefit from accuracy information that is delivered in addition to actual position estimations in order to perform dynamic weighting of different methods. For the herein disclosed method it is possible in an embodiment to derive such a confidence criterion based on the residual vector ($r=\hat{y}-F(\tilde{s})$) after solving the system of equations, or a simple geometric interpretation of the error values resulting from all observed paths, or calculation of the Cramér-Rao lower bound for a given estimated position.

Figure 9A:
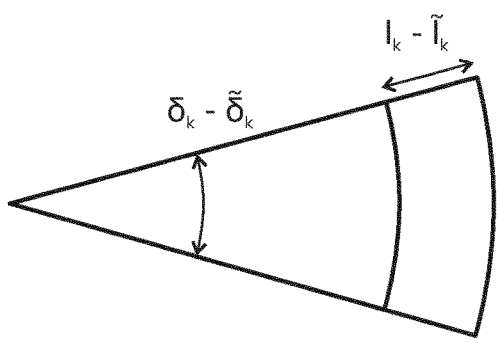
FIG. 9 shows a diagram illustrating the use of confidence information.
Figure 9B:
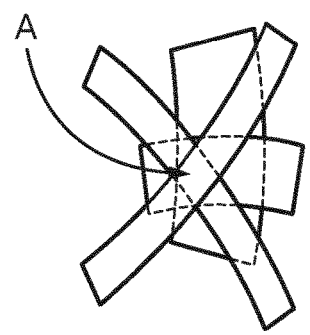

The idea of a geometrical interpretation of the residual vector is stated in FIG. 9. FIG. 9A shows a loop segment belonging to path k derived from the residual errors, remaining after solving the system of equations. The area bounded by the overlaps of respective loop segments A might be used as a confidence criterion (see FIG. 9B). The smaller the bounded area the higher the associated accuracy.

Figure 10:
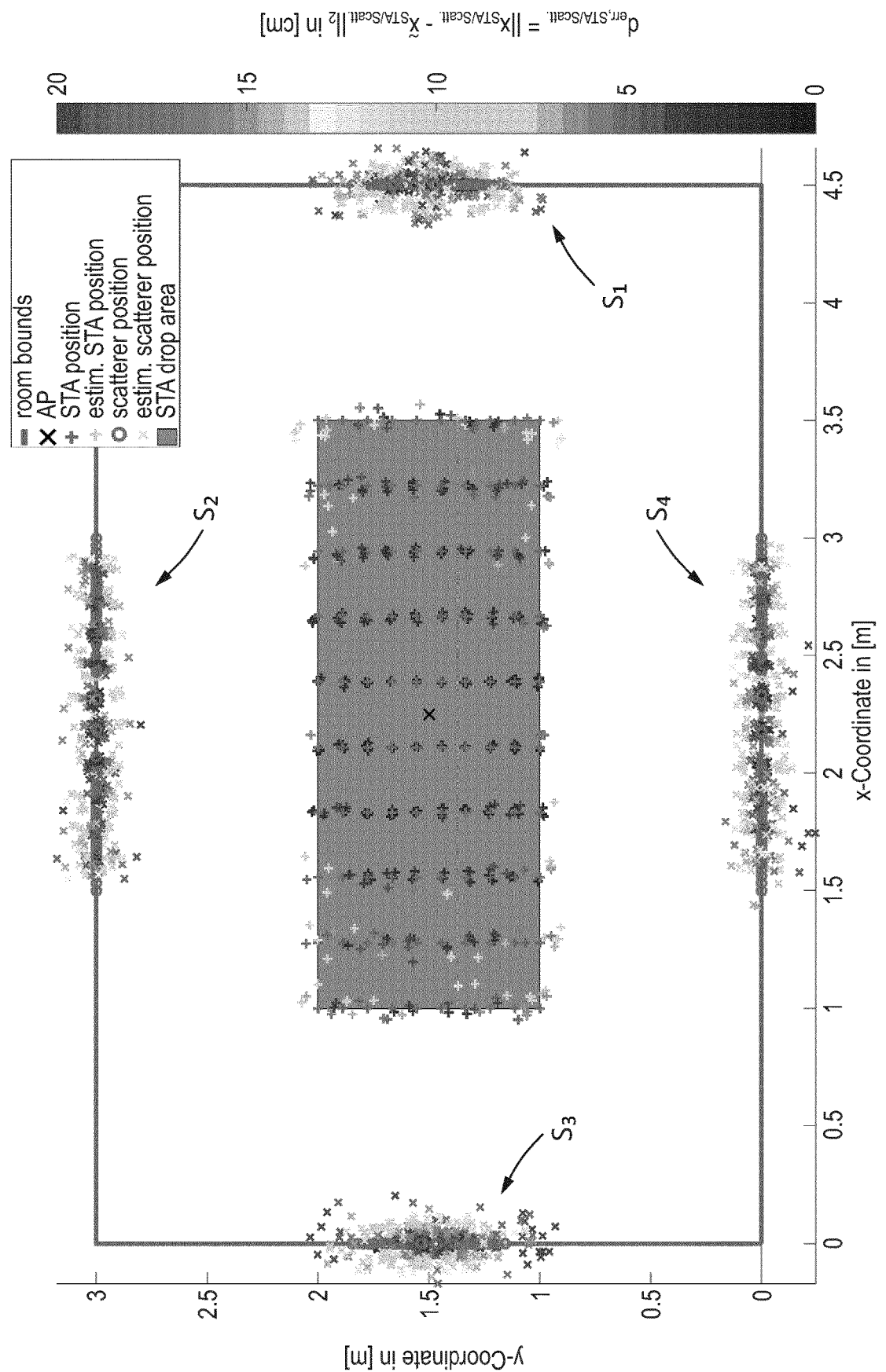
FIG. 10 shows a diagram illustrating the overlay of actual and estimation positions.

FIG. 10 shows an overlay of estimated positions of scatterers $s_1, \ldots, s_4$ and STA locations $s_0$, after multiple positioning estimations of a STA, e.g. placed on several positions on a table. The associated grey-value coding represents the positioning error of respective scatterer/STA. As can be seen from FIG. 10, the NLOS positioning approach not only delivers information on the STAs location but additionally scatterer positions. These positions collected from multiple STA locations (for example observed while a STA moves within a scenario), can be used in order to reconstruct the environmental topography (i.e. walls, obstacles, etc.). This information might further be used in an embodiment for more efficient beam training/tracking and can even be of high value in other applications.

As mmWave communication has potential applications for high quality video streaming for Virtual Reality (VR) or Augmented Reality (AR), the estimated scatterer position might be used to gain knowledge about the users environment without the requirement of additional hardware.

In equation (9) it is shown that all angles are measured with respect to a single reference path in order to define the set of required equations. It is also possible to calculate angles with respect to all paths in order to define even more equations resulting in an increase of accuracy or decrease number of required paths.

Currently standardization bodies deal with the topic of Hybrid-MIMO which allows to use multiple RF chains connected to multiple (potentially spatial separated) PAAs at STA side or AP side or both sides. The presence of additional spatial diversity can be used to gather more AoA/AoD and TOA information and therefore extend the system of equations in (3) or (9) respectively in order to further increase accuracy of estimated positions. Further, in the case of spatially separated antenna arrays, this separation can be introduced into the geometrical relations and thus reduce the degrees of freedom of the resulting system of equations as depicted in (8) and (10). It might be noticed that in order to benefit from the additional information from multiple RF chains, additional signaling of parameters like spatial separation of antennas may be required.

In the equation systems and in the embodiments described above, all equations have been treated with the same weight. Depending on the scenario, it might happen that different variables can be measured with different accuracy. If these accuracies are known or estimated when position estimation is performed, this might be taken into account by weighting the equations relatively to each other.

Further it might be considered in an embodiment that some of the equations state length values and other equations state angles. So these two types of equations might be weighted relatively to each other depending on the observed scenario or accuracy of measured values.

Figure 11:
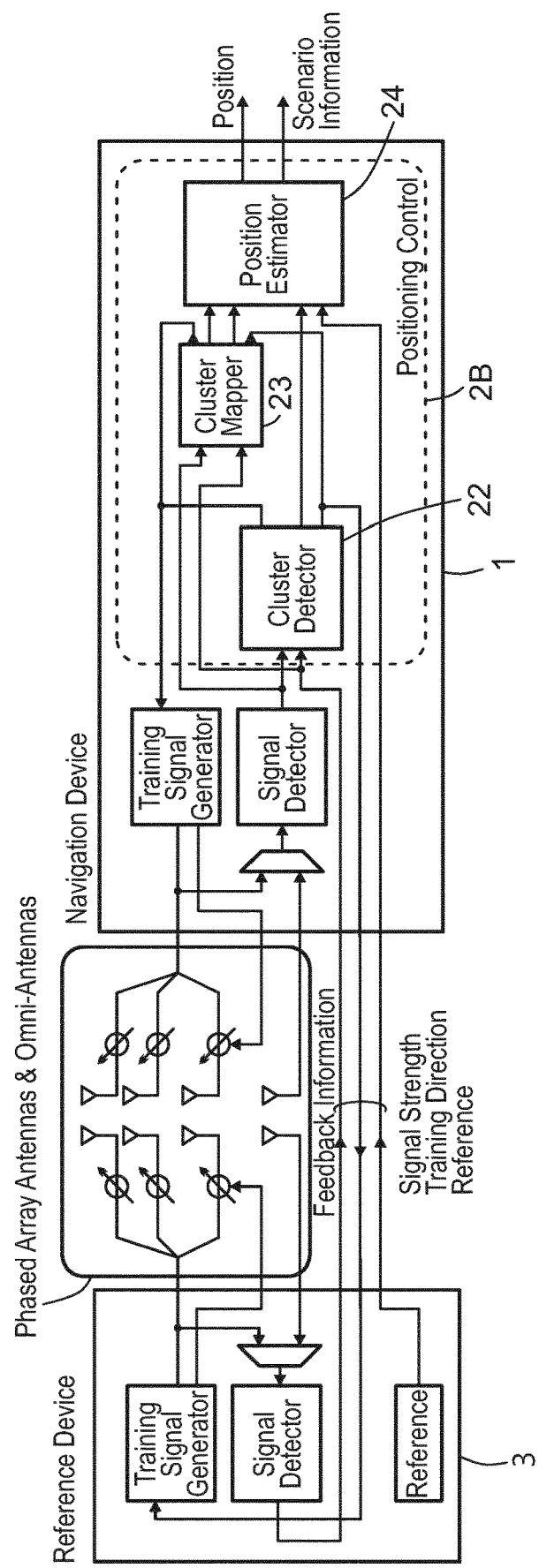
FIG. 11 shows a schematic diagram of a third embodiment of an initiator communication device including an internal position estimation device and a responder communication device according to the present disclosure.

In order to make the proposed method applicable in a standardized communication system a position estimation unit (also called positioning control unit (PCU)) may be located within a navigation device (e.g. an STA) or within a reference device (e.g. an AP) or as an external unit. Incorporating the PCU within the navigation device is most practical for reasons of privacy. FIG. 11 shows a schematic diagram of a third embodiment of an initiator communication device 1 (e.g. a navigation device in this embodiment) including an internal position estimation device 2B (PCU) and a responder communication device 3 (e.g. a reference device in this embodiment) according to the present disclosure.

The functionality of respective units within the PCU 2B will be explained in the following. The input unit 20 is not shown in FIG. 11. The cluster detector 22, the cluster mapper 23 and the position estimator 24 may all be separate elements, e.g. separate processors, or may be part of the processing unit 21 implemented e.g. by a common processor.

The cluster detector 22 analyzes signal strength information and coordinates spatial alignment of PAAs. The signal strength information for practical reasons is generated in a beam-to-omni mode, which means the transmitting device sweeps through transmit beam directions using its PAA, while the receiving device "listens" using a (quasi-) omnidirectional antenna. Based on this information, the Cluster Detector identifies clusters of strong receive power, that result from presence of propagation paths connecting Transmitter and Receiver. Further it classifies these clusters by the order of reflections, which might be done based on received signal power and/or polarization properties.

Finally, each cluster's angular information is estimated. This can be done by finding respective local maxima with respect to receive power and assigning respective AoA/AoD information that has been fed back. More sophisticated methods like curve fitting or correlation with a known antenna gain pattern might be used to estimate angular information more accurately. The output of the cluster detector result contains two sets of clusters (one for AoA and one for AoD) with respective estimated angular information.

After determining cluster information it is not jet clear which clusters on both sides belong to the same propagation path between both devices. In order to pair clusters (i.e. finding clusters of AoA and AoD, corresponding to the same propagation path), the cluster mapper 23 systematically tests through these clusters by instructing both devices to focus specific clusters. After this procedure it is known to the PCU 2B which clusters associated with respective angular information belong to which propagation path. Subsequently the cluster mapper 23 estimates the propagation path length (i.e. by means of time measurement (TM)) of paired clusters. This information is then forwarded jointly with the AoA and AoD information to the position estimator 24.

Finally, the position estimator solves the system of equations like formulated in equations (1) or (9) and as a result provides estimated STA position and scatterer positions.

Figure 12:
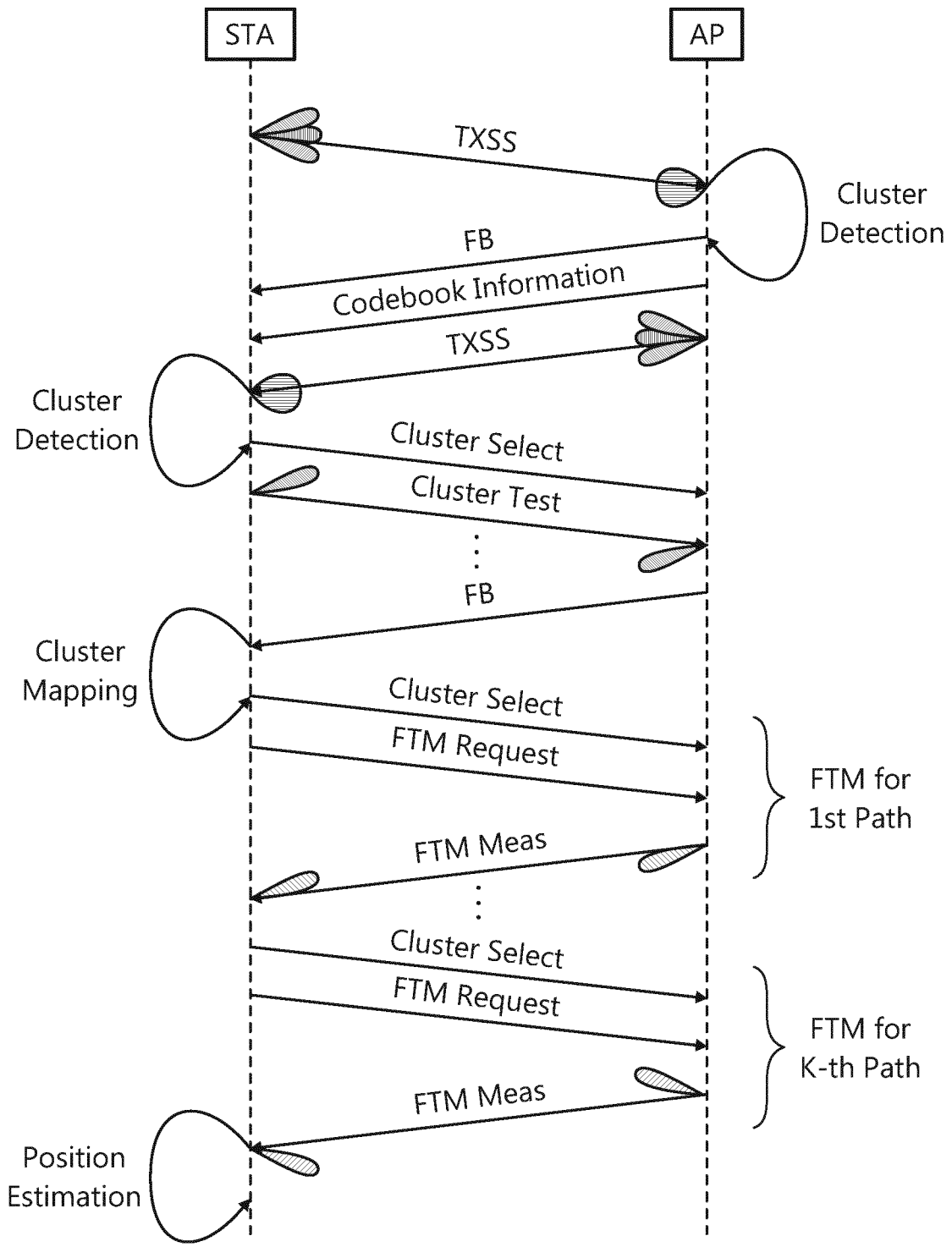
FIG. 12 shows a diagram illustrating the steps of a method for gaining required information on AoA, AoD and TOA.

FIG. 12 shows a diagram illustrating the steps of a method for gaining required information on AoA, AoD and TOA in order to perform position estimation on STA side. The STA first performs a Transmit Sector Sweep (TXSS) while the AP measures received signal power using a (quasi-) omni-directional beam. Measured signal strength values are fed back (FB) to the STA. Subsequently this procedure is followed vice versa, without the need for feedback of measured signal strength values. After cluster detection has been performed on both sides and information has been accumulated on STA side, the cluster mapping can be performed by selecting different pairs of clusters and again measuring and comparing the resulting received signal strength. Finally FTM is performed for each of the detected clusters to gain distance information for the present paths.

Further, it is preferred that in a communication system both participants (initiator and responder, or STA and AP) use the same convention to share their angular and time/range measurements. Therefore a signaling scheme may be used. Preferably, the following information may be exchanged:

- Purpose of beam training, e.g. link for communication, LOS-link for positioning, links via reflectors for NLOS positioning;
- Presence of an absolute angular reference (indicates whether approach 1 or approach 2 can be applied; if no absolute angular reference is present (i.e. approach 2 has to be followed), it shall signaled which propagation path/cluster/scatterer is used as a reference;
- Codebook information (AoD information and/or beam shape information) for tested beams;
- Received Signal Strength information for tested beams;
- Results of the position estimation (STA-Position and/or scatterer position).

In contrast to known systems, beam training may be performed not only with the goal to find a "good" communication link or a LOS link for positioning, but a mode that allows to search for all links that connect both devices via scatterers.

Figure 13:
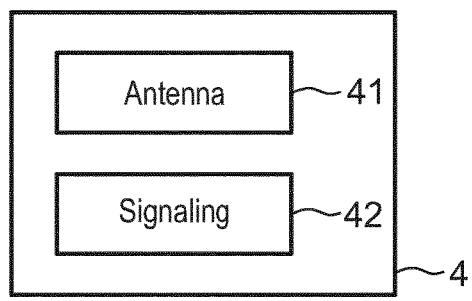
FIG. 13 shows a schematic diagram of another embodiment of a communication device according to the present disclosure.

FIG. 13 shows a schematic diagram of another embodiment of a communication device 4 according to the present disclosure. The communication device 4 may a an initiator or receiver, i.e. the station STA and/or the AP can be implemented in such a way, depending on the requirements of a particular system or application, in which the device shall be applied.

The communication device 4 comprises antenna circuitry comprising one or more antenna elements 41 for transmitting and receiving RF signals. Further, the communication device 4 comprises signalling circuitry 42 configured to signal spatial codebook information including, per codebook index, angle of departure information indicating the angle of departure of an RF signal from the communication device. The signalling circuitry may signal additional information as will be explained below.

Table 1 shows an exemplary signaling structure that can be used to exchange detailed codebook information between the STA, the AP and the position estimation device, i.e. that may be signalled by the signalling circuitry 42. The current standard allows to exchange codebook information only on a level of codebook indices, which allows to handle codebook information easily on an abstract level. However, due to abstraction, spatial information (i.e. properties like shape or direction of the main lobe) are lost.

TABLE 1

| Field | | Size | Meaning |
|---|---|---|---|
| Element ID | | 8 bits | |
| Length | | 8 bits | |
| Beamforming gain information | $Gain_1$ | $N_G$ bits | Gain of codebook index 1 |
| | $Gain_2$ | $N_G$ bits | Gain of codebook index 2 |
| | . | | |
| | . | | |
| | . | | |
| | $GainN_{CB}$ | $N_G$ bits | Gain of codebook index $N_{CB}$ |
| Direction information in azimuth dimension | $\theta_1$ | $N_\theta$ bits | Beamforming direction related to codebook index 1 in azimuth dimension |
| | $\theta_2$ | $N_\theta$ bits | Beamforming direction related to codebook index 2 in azimuth dimension |
| | . | | |
| | . | | |
| | . | | |
| | $\theta_{N_{CB}}$ | $N_\theta$ bits | Beamforming direction related to codebook index $N_{CB}$ in azimuth dimension |
| Direction information in elevation dimension [1] | $\phi_1$ | $N_\phi$ bits | Beamforming direction related to codebook index 1 in elevation dimension |
| | $\phi_2$ | $N_\phi$ bits | Beamforming direction related to codebook index 2 in elevation dimension |
| | . | | |
| | . | | |
| | . | | |
| | $\phi_{N_{CB}}$ | $N_\phi$ bits | Beamforming direction related to codebook index $N_{CB}$ in elevation dimension |

[1] Present only if antenna allows beamforming in more than one dimension.

Figure 14:
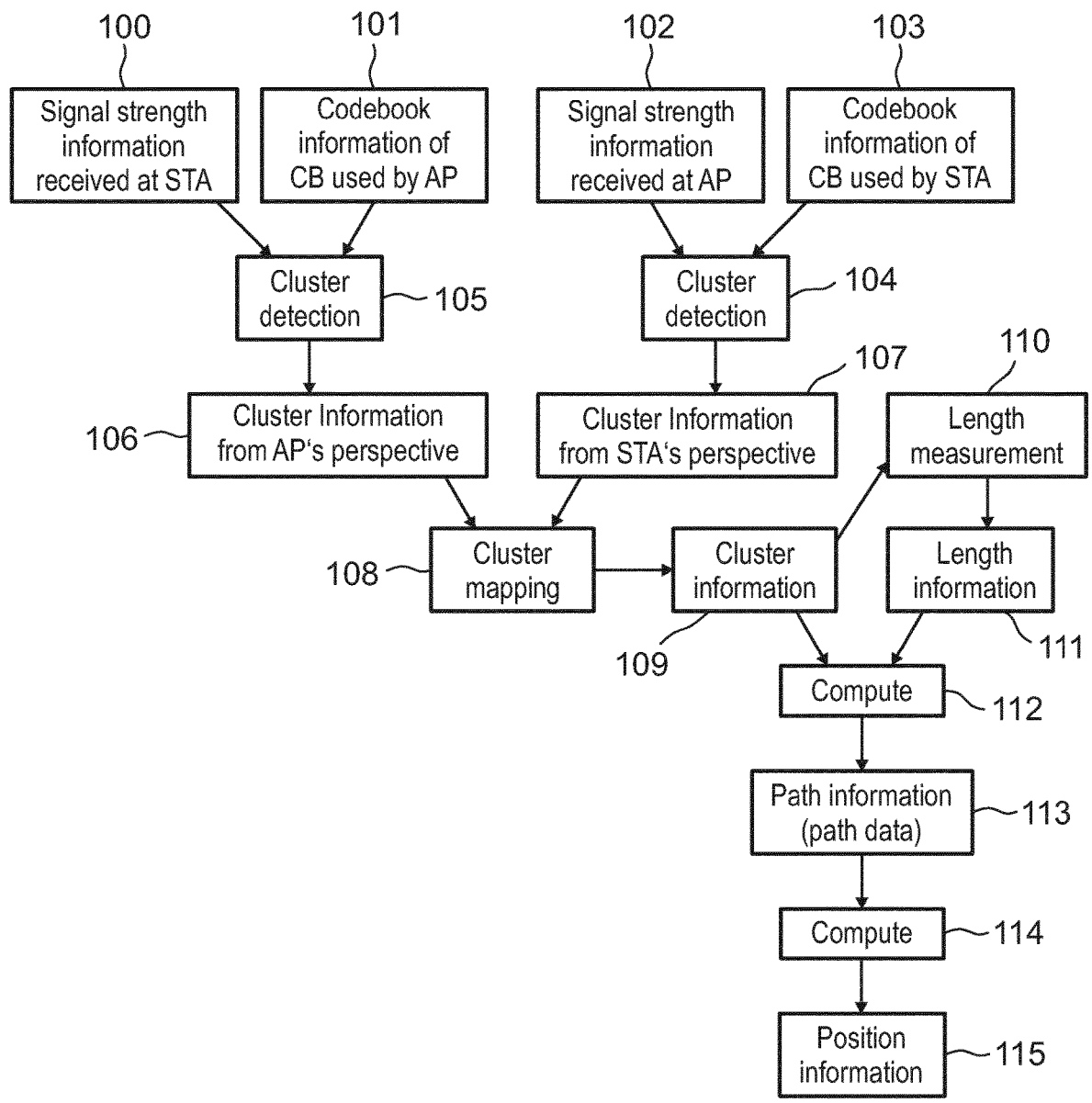
FIG. 14 shows a flow chart of an embodiment of a position determination method illustrating the steps and the information used to obtain position information.

For the purpose of illustrating which entity requires information on codebooks and how it is processed, FIG. 14 shows a flow chart of an embodiment of a position determination method illustrating the steps and the information used to obtain position information. Multiple options exist, by which entities the information might be processed and which information has to be signaled accordingly.

In general, to detect clusters (i.e. the path of rays of emitted radiation) that interconnect STA and AP and derive their properties like direction and signal strength, two types of information 100-103 should be available (see first row of FIG. 14): The signal strength and the transmit direction. At the STA the signal strength information 100 as measured by the STA and the codebook (CB) information 101 of the CB used and signalled by the AP are available. At the AP the signal strength information 102 as measured by the AP and the CB information 103 of the CB used and signalled by the STA are available.

In a scenario like in FIG. 1, the processing of this information can be done by the STA and the AP separately, or within one of the devices jointly.

If it is done at the STA and the AP separately, the following steps are performed: The CB information of STA's CB is signalled to the AP. The AP performs cluster detection (step 104) by using received signal strength and the STA's CB information. The AP feeds back cluster information to the STA. The CB information of the AP's codebook is signaled to the STA. The STA performs cluster detection (step 105) by using received signal strength and the AP's CB information.

If it is done at the STA jointly the CB information of the AP's codebook is signaled to the STA, together with the received signal strength information. Subsequently the STA performs cluster detection for both sides (steps 104-105).

In a scenario like in FIG. 2, both of the above mentioned options are applicable. Additionally, it is possible that cluster detection is performed neither by the STA not by the AP but by the positioning estimation device itself. In this case the CB information of the AP's codebook and of the STA's codebook is signaled to the positioning estimation device. Further, the signal strength information of the AP and STA is signalled to the positioning estimation device.

If in a scenario like in FIG. 2 the STA and the AP perform cluster detection by themselves only resulting path data, as described herein, is signaled to the position estimation device.

Based on the cluster information from the AP's perspective 106 and the cluster information from the STA's perspective 107 cluster mapping is performed (step 108) to obtain common cluster information 109. Length measurement is performed (step 110) to obtain length information 111. Based on the cluster information 109 and the length information 111 the path data 113 can be determined in a computing step (step 112). From the path data 113 the position information 115 is determined in another computing step (step 114).

In case of relative angular measurement a reference path may be used in the computing step 114. In case of absolute angular measurement a reference direction may be used in the computing step 114. In case of absolute positioning a reference position may be used in a further computing step (not shown) to compute absolute position information from the position information 115.

Further information may be signaled, such as path length information indicating the length of the propagation path of an RF signal from another communication device via a scatterer to the communication device. The information on path length itself should particularly be signaled depending on which entity performs steps 110 and the following steps.

The proposed solution is well suited to be adopted by further IEEE802.11ay products because i) it fits the proposed architecture for the future 802.11ay or 802.11az standard in which respective antenna configurations are employed ii) it requires only slight modifications to the requirements specification of the 802.11az standard. It does not require to have LOS connection and therefore enables positioning even in challenging environments with no LOS present. Further it does not require presence of an angular reference direction, which is difficult to obtain in practice. Even in LOS situations the proposed method might enhance poisoning accuracy compared to LOS only solutions. Additionally the solution gives the opportunity to gain information about the scenario which can be useful in many ways.

Thus, the foregoing discussion discloses and describes merely exemplary embodiments of the present disclosure. As will be understood by those skilled in the art, the present disclosure may be embodied in other specific forms without departing from the spirit or essential characteristics thereof. Accordingly, the disclosure of the present disclosure is intended to be illustrative, but not limiting of the scope of the disclosure, as well as other claims. The disclosure, including any readily discernible variants of the teachings herein, defines, in part, the scope of the foregoing claim terminology such that no inventive subject matter is dedicated to the public.

In the claims, the word "comprising" does not exclude other elements or steps, and the indefinite article "a" or "an" does not exclude a plurality. A single element or other unit may fulfill the functions of several items recited in the claims. The mere fact that certain measures are recited in mutually different dependent claims does not indicate that a combination of these measures cannot be used to advantage.

In so far as embodiments of the disclosure have been described as being implemented, at least in part, by software-controlled data processing apparatus, it will be appreciated that a non-transitory machine-readable medium carrying such software, such as an optical disk, a magnetic disk, semiconductor memory or the like, is also considered to represent an embodiment of the present disclosure. Further, such a software may also be distributed in other forms, such as via the Internet or other wired or wireless telecommunication systems.

The elements of the disclosed devices, apparatus and systems may be implemented by corresponding hardware and/or software elements, for instance appropriated circuits. A circuit is a structural assemblage of electronic components including conventional circuit elements, integrated circuits including application specific integrated circuits, standard integrated circuits, application specific standard products, and field programmable gate arrays. Further a circuit includes central processing units, graphics processing units, and microprocessors which are programmed or configured according to software code. A circuit does not include pure software, although a circuit includes the above-described hardware executing software.

It follows a list of further embodiments of the disclosed subject matter:

1. A position estimation device for estimating the position of an initiator communication device, said position estimation device comprising:
   data obtaining circuitry configured to obtain path data of two or more paths of RF signals transmitted by a responder communication device, wherein RF signals of at least one path are reflected at a scatterer, said path data comprising, per path of an RF signal:
      path length information indicating the length of the propagation path of an RF signal from the responder communication device via a scatterer to the initiator communication device,
      angle of departure information indicating the angle of departure of an RF signal from the responder communication device, and
      angle of arrival information indicating the angle of arrival of an RF signal at the initiator communication device; and
   processing circuitry configured to determine the position of the initiator communication device on the basis of the obtained path data.

2. The position estimation device as defined in any preceding embodiment,
   wherein said angle of departure information indicates the angle of departure of an RF signal from the responder communication device with respect to a first angular reference and/or said angle of arrival information indicates the angle of arrival of an RF signal at the initiator communication device with respect to a second angular reference.

3. The position estimation device as defined in any preceding embodiment,
   wherein said data obtaining circuitry is configured to receive or retrieve at least part of the path data as input.

4. The position estimation device as defined in any preceding embodiment,
   wherein said data obtaining circuitry is configured to measure or estimate at least part of the path data.

5. The position estimation device as defined in embodiment 4,
wherein said data obtaining circuitry is configured to determine the path length information from two or more measurements of the time of flight of an RF signal from the responder communication device to the initiator communication device.

6. The position estimation device as defined in embodiment 4,
wherein said data obtaining circuitry is configured to determine the angle of departure information and/or the angle of arrival information by use of beamforming training of beams between responder communication device and the initiator communication device and/or by comparing or modifying phase or delays between antenna elements of a known antenna geometry for received and transmitted signals.

7. The position estimation device as defined in any preceding embodiment,
wherein said processing circuitry is configured to determine the position of the initiator communication device on the basis of the obtained path data by solving a system of equations using the obtained path data and geometrically defined parameters of the path data and, optionally in case of absolute position estimation, reference position of the responder communication device.

8. The position estimation device as defined in embodiment 7,
wherein said processing circuitry is configured to find solution candidates for the system of equations in an iterative process using as start values for the two or more scatterers one or more positions in between the respective propagation path from the responder communication device via the respective scatterer to the initiator communication device.

9. The position estimation device as defined in embodiment 7,
wherein said processing circuitry is configured to find solution candidates for the system of equations in an iterative process using as start value for position of the initiator communication device one or more positions from a grid of positions determined by the estimated path lengths, wherein the grid is a regular quadratic grid with bounds derived from estimated path lengths or a subset of positions chosen such that the number of seed values is minimized, and wherein the final solution is selected from all solution candidates by comparing their residual error and/or convergence behavior.

10. The position estimation device as defined in any preceding embodiment,
wherein said processing circuitry is configured to determine the position of the initiator communication device on the basis of the obtained path data by minimizing the error between the obtained path data and geometrically defined parameters of the path data.

11. The position estimation device as defined in any preceding embodiment 0,
wherein said processing circuitry is configured to minimize the error by use of Gauss-Newton algorithm, Levenberg-Marquardt method, Deep Neural Network, Particle Filter, Kalman Filter, or Gradient Descend.

12. The position estimation device as defined in any one of embodiments 2 to 11,
wherein said first angular reference and said second angular reference are a common predetermined reference plane or reference line.

13. The position estimation device as in any one of embodiments 2 to 12,
wherein said first angular reference is a first section of a propagation path of an RF signal from the responder communication device to a scatterer to the initiator communication device, said first section lying between the responder communication device and the scatterer, and said second angular reference is a second section of said propagation path of an RF signal from the responder communication device via said scatterer to the initiator communication device, said second section lying between the scatterer and the initiator communication device.

14. The position estimation device as claimed in any one of embodiments 2 to 13,
wherein said data obtaining circuitry is configured to obtain path information including angle of departure information indicating the angles of departure with respect to two or more angular references, in particular with respect to two or more of said propagation paths, and angle of arrival information indicating angles of arrival with respect to two or more angular references, in particular with respect to two or more of said propagation paths.

15. The position estimation device as defined in any preceding embodiment,
wherein said data obtaining circuitry is configured to obtain direct line of sight data comprising
  path length information indicating the length of the direct line of sight path of an RF signal from the responder communication device to the initiator communication device,
  angle of departure information indicating the angle of departure of an RF signal from the responder communication device, and
  angle of arrival information indicating the angle of arrival of an RF signal at the initiator communication device; and
wherein said processing circuitry is configured to determine the position of the initiator communication device on the basis of the obtained path data and the obtained direct line of sight data.

16. The position estimation device as defined in any preceding embodiment,
wherein said processing circuitry is configured to determine confidence information indicating the confidence of the determined position of the initiator communication device, wherein said confidence information is determined by
  determining a residual vector after solving a system of equations used for determining the position of the initiator communication device, or
  determining a geometric interpretation of error values resulting from the observed paths between the responder communication device and the initiator communication device, or
  determining a Cramér-Rao lower bound for the determined position.

17. The position estimation device as defined in any preceding embodiment,
wherein said processing circuitry is configured to determine the position of the one or more scatterers and to determine an environmental mapping from the positions of the one or more scatterers determined one or more times for one or more different positions of the initiator communication device.

18. The position estimation device as defined in any preceding embodiment,
wherein said data obtaining circuitry is configured to obtain one set of path data per antenna element of an antenna array of said initiator communication device and, if available, geometrical information about the antenna arrangement and wherein said processing circuitry is configured to determine the position of the initiator communication device on the basis of the obtained sets of path data.

19. The position estimation device as defined in any preceding embodiment, wherein said processing circuitry is configured to weight equations of the system of equations based on accuracy information indicating the accuracy of the obtained information used in the respective equation and/or based on scenario information indicating the type of information used in the respective equation and/or based on results of preceding estimations.

20. The position estimation device as defined in embodiment 6, wherein said processing circuitry is configured to perform cluster mapping based on signal strength information obtained by the initiator communication device and the responder communication device during beamforming training in order to determine clusters at the initiator communication device and the responder communication device belonging to the same propagation path.

21. A communication device for RF based communication with another communication device, said communication device comprising:
antenna circuitry comprising one or more antenna elements for transmitting and receiving RF signals; and
a position estimation device as defined in any preceding embodiment for determining the position of the communication device or of the other communication device.

22. The communication device as defined in embodiment 21, further comprising signalling circuitry configured to signal one or more of the kind and/or purpose of beamforming, the presence of an angular reference, spatial codebook information, received signal strength information, and geometrical information about antenna arrangement.

23. A position estimation method for estimating the position of an initiator communication device, said position estimation method comprising:
obtaining path data of two or more paths of RF signals transmitted by a responder communication device, wherein RF signals of at least one path are reflected at a scatterer, said path data comprising, per path of an RF signal:
path length information indicating the length of the propagation path of an RF signal from the responder communication device via a scatterer to the initiator communication device,
angle of departure information indicating the angle of departure of an RF signal from the responder communication device, and
angle of arrival information indicating the angle of arrival of an RF signal at the initiator communication device; and
determining the position of the initiator communication device on the basis of the obtained path data.

24. A non-transitory computer-readable recording medium that stores therein a computer program product, which, when executed by a processor, causes the method according to embodiment 23 to be performed.

25. A computer program comprising program code means for causing a computer to perform the steps of said method according to embodiment 23 when said computer program is carried out on a computer.

26. A communication device for RF based communication with another communication device, said communication device comprising:
antenna circuitry comprising one or more antenna elements for transmitting and receiving RF signals; and
signalling circuitry configured to signal spatial codebook information including, per codebook index, angular information indicating the angle of departure and/or the angle of arrival of an RF signal from the communication device.

27. A position estimation device for estimating the position of an initiator communication device, said position estimation device comprising:
data obtaining circuitry configured to obtain path data of two or more paths of RF signals transmitted by a responder communication device, said path data comprising, per path of an RF signal:
path length information indicating the length of the propagation path of an RF signal from the responder communication device to the initiator communication device,
angle of departure information indicating the angle of departure of an RF signal from the responder communication device, and
angle of arrival information indicating the angle of arrival of an RF signal at the initiator communication device; and
processing circuitry configured to determine the position of the initiator communication device on the basis of the obtained path data.

28. The position estimation device as defined in embodiment 27, wherein the RF signals of at least one path are reflected at a scatterer, or wherein none of the RF signals of the at least two paths is reflected at a scatterer.

The invention claimed is:

1. A position estimation device to estimate the position of an initiator communication device, said position estimation device comprising:
data obtaining circuitry configured to obtain path data of two or more propagation paths of RF signals transmitted by a responder communication device, wherein RF signals of at least one path are reflected at a scatterer, said path data comprising, per path of an RF signal:
path length information indicating a length of the propagation path of the RF signal from the responder communication device via the scatterer to the initiator communication device,
angle of departure information indicating an angle of departure of the RF signal from the responder communication device, wherein said angle of departure information indicates the angle of departure of the RF signal from the responder communication device with respect to a first angular reference, wherein said first angular reference is a first section of the propagation path of the RF signal from the responder communication device via the scatterer to the initiator communication device, said first section lying between the responder communication device and the scatterer, and
angle of arrival information indicating an angle of arrival of the RF signal at the initiator communication device, wherein said angle of arrival information indicates the angle of arrival of the RF signal at the initiator communication device with respect to a second angular reference, wherein said second angular reference is a second section of said propagation path of the RF signal from the responder communication device via the scatterer to the initiator communication device, said second section lying between the scatterer and the initiator communication device; and processing circuitry configured to determine the position of the initiator communication device based on the obtained path data.

2. The position estimation device as claimed in claim 1, wherein said data obtaining circuitry is configured to receive or retrieve at least part of the path data as input and/or to measure or estimate at least part of the path data.

3. The position estimation device as claimed in claim 2, wherein said data obtaining circuitry is configured to determine the path length information from two or more measurements of a time of flight of the RF signal from the responder communication device to the initiator communication device.

4. The position estimation device as claimed in claim 2, wherein said data obtaining circuitry is configured to determine the angle of departure information and/or the angle of arrival information by use of beamforming training of beams between responder communication device and the initiator communication device and/or by comparing or modifying phase or delays between antenna elements of a known antenna geometry for received and transmitted signals.

5. The position estimation device as claimed in claim 1, wherein said processing circuitry is configured to determine the position of the initiator communication device based on the obtained path data by solving a system of equations using the obtained path data and geometrically defined parameters of the path data and, in case of absolute position estimation, reference position of the responder communication device.

6. The position estimation device as claimed in claim 5, wherein said processing circuitry is configured to find solution candidates for the system of equations in an iterative process using as start values for the two or more scatterers one or more positions in between the respective propagation path from the responder communication device via the respective scatterer to the initiator communication device and using as start value for position of the initiator communication device one or more positions from a grid of positions determined by the estimated path lengths.

7. The position estimation device as claimed in claim 1, wherein said processing circuitry is configured to determine the position of the initiator communication device based on the obtained path data by minimizing the error between the obtained path data and geometrically defined parameters of the path data, in particular to minimize the error by use of Gauss-Newton algorithm, Levenberg-Marquardt method, Deep Neural Network, Particle Filter, Kalman Filter, or Gradient Descend.

8. The position estimation device as claimed in claim 1, wherein said data obtaining circuitry is configured to obtain path information including the angle of departure information indicating the angles of departure with respect to two or more angular references, in particular with respect to two or more of said propagation paths, and angle of arrival information indicating angles of arrival with respect to two or more angular references, in particular with respect to two or more of said propagation paths.

9. The position estimation device as claimed in claim 1, wherein said data obtaining circuitry is configured to obtain direct line of sight data comprising:

path length information indicating a length of the direct line of sight path of the RF signal from the responder communication device to the initiator communication device, wherein said processing circuitry is configured to determine the position of the initiator communication device based on the obtained path data and the Obtained direct line of sight data.

10. The position estimation device as claimed in claim 1, wherein said processing circuitry is configured to determine confidence information indicating a confidence of the determined position of the initiator communication device, wherein said confidence information is determined by determining a residual vector after solving a system of equations used for determining the position of the initiator communication device, or determining a geometric interpretation of error values resulting from the observed paths between the responder communication device and the initiator communication device, or determining a Cramer-Rao lower bound for the determined position.

11. The position estimation device as claimed in claim 1, wherein said processing circuitry is configured to determine the position of the one or more scatterers and to determine an environmental mapping from the positions of the one or more scatterers determined one or more times for one or more different positions of the initiator communication device.

12. The position estimation device as claimed in claim 1, wherein said data obtaining circuitry is configured to obtain one set of path data per antenna element of an antenna array of said initiator communication device and, if available, geometrical information about the antenna arrangement, and wherein said processing circuitry is configured to determine the position of the initiator communication device based on the obtained sets of path data.

13. The position estimation device as claimed in claim 1, wherein said processing circuitry is configured to weight equations of a system of equations based on accuracy information indicating the accuracy of the Obtained information used in the respective equation and/or based on scenario information indicating the type of information used in the respective equation and/or based on results of preceding estimations.

14. The position estimation device as claimed in claim 4, wherein said processing circuitry is configured to perform cluster mapping based on signal strength information obtained by the initiator communication device and the responder communication device during beamforming training in order to determine clusters at the initiator communication device and the responder communication device belonging to the same propagation path.

15. A communication device for RF based communication with another communication device, said communication device comprising:

antenna circuitry comprising one or more antenna elements for transmitting and receiving RF signals; and the position estimation device as claimed in claim 1 to determine the position of the communication device or of the other communication device.

16. The communication device as claimed in claim 15, further comprising signalling circuitry configured to signal one or more of the kind and/or purpose of beamforming, a presence of an angular reference in the form of the first angular reference and/or the second angular reference, spatial codebook information, received signal strength information, and geometrical information about antenna arrangement.

17. A communication device for RF based communication with another communication device, said communication device comprising:
antenna circuitry comprising one or more antenna elements to transmit and receive RF signals, wherein signal strength of received RF signals is measured using an omni-directional or quasi-omni-directional beam during beamforming training;
signalling circuitry configured to signal the measured signal strength and spatial codebook information including, per codebook index, angular information indicating an angle of departure and/or an angle of arrival of at least one of the RF signals from the communication device; and
processing circuitry configured to perform cluster mapping based on the measured signal strength and signal strength information received from the another communications device during beamforming training in order to determine clusters at the communication device and another communication device belonging to a same propagation path.

18. A position estimation method for estimating the position of an initiator communication device, said position estimation method comprising:
obtaining path data of two or more propagation paths of RF signals transmitted by a responder communication device, wherein RF signals of at least one path are reflected at a scatterer, said path data comprising, per path of an RF signal:
path length information indicating a length of the propagation path of the RF signal from the responder communication device via the scatterer to the initiator communication device,
angle of departure information indicating the angle of departure of an RF signal from the responder communication device, wherein said angle of departure information indicates the angle of departure of the RF signal from the responder communication device with respect to a first angular reference, wherein said first angular reference is a first section of the propagation path of the RF signal from the responder communication device via the scatterer to the initiator communication device, said first section lying between the responder communication device and the scatterer, and
angle of arrival information indicating an angle of arrival of the RF signal at the initiator communication device, wherein said angle of arrival information indicates the angle of arrival of the RF signal at the initiator communication device with respect to a second angular reference, wherein said second angular reference is a second section of said propagation path of the RF signal from the responder communication device via the scatterer to the initiator communication device said second section lying between the scatterer and the initiator communication device; and
determining the position of the initiator communication device based on the obtained path data.

19. A non-transitory computer-readable recording medium that stores therein a computer program product, which, when executed by a processor, causes the method according to claim 18 to be performed.

* * * * *